United States Patent
Purohit

(10) Patent No.: US 10,728,814 B2
(45) Date of Patent: *Jul. 28, 2020

(54) HITLESS SOFTWARE UPGRADE FOR A VIRTUALIZED GATEWAY COORDINATING MULTIPLE SMALL CELL RADIO ACCESS NETWORKS

(71) Applicant: Corning Optical Communications LLC, Charlotte, NC (US)

(72) Inventor: Darshan Purohit, Fremont, CA (US)

(73) Assignee: Corning Optical Communications LLC, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/176,317

(22) Filed: Oct. 31, 2018

(65) Prior Publication Data

US 2019/0069206 A1  Feb. 28, 2019

Related U.S. Application Data

(63) Continuation of application No. 15/069,220, filed on Mar. 14, 2016, now Pat. No. 10,129,805.
(Continued)

(51) Int. Cl.
*H04W 36/08* (2009.01)
*H04L 12/24* (2006.01)
(Continued)

(52) U.S. Cl.
CPC ........... *H04W 36/08* (2013.01); *H04L 41/082* (2013.01); *H04L 67/1008* (2013.01); *H04W 36/0055* (2013.01); *H04W 52/40* (2013.01)

(58) Field of Classification Search
None
See application file for complete search history.

(56) References Cited

U.S. PATENT DOCUMENTS 8,982,841 B2  3/2015  Srinivasan
10,129,805 B2 * 11/2018  Purohit ............... H04L 67/1008
(Continued)

OTHER PUBLICATIONS

Non-Final Office Action for U.S. Appl. No. 16/201,112, dated Nov. 25, 2019, 21 pages.
(Continued)

*Primary Examiner* — Noel R Beharry
*Assistant Examiner* — Pamit Kaur
(74) *Attorney, Agent, or Firm* — C. Keith Montgomery

(57) ABSTRACT

A method for upgrading an access controller that controls and coordinates a plurality of radio nodes (RNs) each associated with a cell in a cluster of cells belonging to a radio access network includes initializing a new access controller. The new access controller is to replace a current access controller currently controlling and coordinating the plurality of RNs cell in the cluster. A most lightly loaded one of the plurality of RNs is identified. All UEs currently attached to the identified RN is caused to be handed off to a neighboring cell in the cluster. After all the UEs have been handed-off from the identified RN, the identified RN is rebooted so that it is being controlled and coordinated by the new access controller. The steps of causing the UEs to be handed-off and rebooting the identified RN are repeated for a second one of the plurality of RNs.

18 Claims, 8 Drawing Sheets

Related U.S. Application Data

(60) Provisional application No. 62/132,094, filed on Mar. 12, 2015.

(51) Int. Cl.
*H04W 36/00* (2009.01)
*H04L 29/08* (2006.01)
*H04W 52/40* (2009.01)

(56) References Cited

U.S. PATENT DOCUMENTS

| | | |
|---|---|---|
| 2005/0207408 A1 | 9/2005 | Elliott |
| 2007/0291836 A1 | 12/2007 | Shi et al. |
| 2009/0310584 A1 | 12/2009 | Viorel et al. |
| 2010/0167730 A1 | 7/2010 | Shin |
| 2010/0315974 A1 | 12/2010 | Richardson et al. |
| 2011/0096714 A1 | 4/2011 | French et al. |
| 2011/0244866 A1 | 10/2011 | Yamamoto et al. |
| 2012/0071168 A1 | 3/2012 | Tomici et al. |
| 2012/0134294 A1 | 5/2012 | Puthenpura et al. |
| 2012/0140627 A1 | 6/2012 | Puthenpura et al. |
| 2012/0142360 A1 | 6/2012 | Puthenpura et al. |
| 2012/0208579 A1 | 8/2012 | Persson et al. |
| 2013/0018978 A1 | 1/2013 | Crowe et al. |
| 2013/0143541 A1 | 6/2013 | Henderson et al. |
| 2013/0210436 A1 | 8/2013 | Srinivasan et al. |
| 2013/0272132 A1* | 10/2013 | Heo .................. H04W 72/085 370/236.2 |
| 2013/0294403 A1 | 11/2013 | Srinivasan |
| 2013/0310095 A1 | 11/2013 | El-Najjar |
| 2013/0337832 A1 | 12/2013 | Park et al. |
| 2014/0036816 A1 | 2/2014 | Madan et al. |
| 2014/0050086 A1 | 2/2014 | Himayat et al. |
| 2014/0092730 A1 | 4/2014 | Yang |
| 2014/0095325 A1 | 4/2014 | Kim et al. |
| 2014/0269502 A1 | 9/2014 | Forenza et al. |
| 2014/0376374 A1 | 12/2014 | Moser et al. |
| 2015/0031354 A1 | 1/2015 | Nuss et al. |
| 2015/0043390 A1 | 2/2015 | Wang et al. |
| 2015/0173011 A1 | 6/2015 | Das et al. |
| 2015/0257051 A1 | 9/2015 | Rao et al. |
| 2015/0295807 A1 | 10/2015 | Huang et al. |
| 2016/0062758 A1 | 3/2016 | Narayanan et al. |
| 2016/0095012 A1 | 3/2016 | Laukkanen |
| 2016/0112945 A1 | 4/2016 | Chen et al. |
| 2016/0262038 A1 | 9/2016 | Dunn et al. |
| 2016/0262063 A1 | 9/2016 | Chen et al. |
| 2016/0262069 A1 | 9/2016 | Parsay et al. |
| 2016/0269954 A1 | 9/2016 | Purohit |
| 2017/0311217 A1 | 10/2017 | Jung et al. |
| 2019/0097891 A1 | 3/2019 | Dandekar et al. |

OTHER PUBLICATIONS

International Preliminary Report on Patentability for PCT/US2016/022372, dated Sep. 21, 2017, 10 pages.
International Search Report and Written Opinion for PCT/US2016/022372, dated Aug. 30, 2016, 13 pages.
Partial Supplementary European Search Report for European Patent Application No. 16762711.6, dated Oct. 11, 2018, 9 pages.
Extended European Search Report for European Patent Application No. 16762711.6, dated Jan. 18, 2019, 9 pages.
Non-Final Office Action for U.S. Appl. No. 15/069,781, dated Feb. 14, 2018, 28 pages.
Notice of Allowance and Examiner-Initiated Interview Summary for U.S. Appl. No. 15/069,781, dated Aug. 2, 2018, 9 pages.
Non-Final Office Action for U.S. Appl. No. 15/081,311, dated Mar. 8, 2018, 17 pages.
Final Office Action for U.S. Appl. No. 15/081,311, dated Sep. 20, 2018, 7 pages.
Advisory Action for U.S. Appl. No. 15/081,311, dated Jan. 18, 2019, 3 pages.
Advisory Action for U.S. Appl. No. 15/081,311, dated Feb. 8, 2019, 3 pages.
Non-Final Office Action for U.S. Appl. No. 15/069,220, dated Dec. 15, 2017, 16 pages.
Notice of Allowance for U.S. Appl. No. 15/069,220, dated Jul. 12, 2018, 8 pages.
Non-Final Office Action for U.S. Appl. No. 15/059,235, dated Oct. 19, 2017, 18 pages.
Final Office Action for U.S. Appl. No. 15/059,235, dated Mar. 21, 2018, 20 pages.
Advisory Action for U.S. Appl. No. 15/059,235, dated May 30, 2018, 3 pages.
Examiner's Answer to the Appeal Brief for U.S. Appl. No. 15/059,235, dated Dec. 10, 2018, 13 pages.
Decision on Appeal for U.S. Appl. No. 15/059,235, dated Jun. 4, 2020, 9 pages.
Final Office Action for U.S. Appl. No. 16/201,112, dated Mar. 10, 2020, 21 pages.
Notice of Allowance for U.S. Appl. No. 16/201,112, dated May 18, 2020, 9 pages.

* cited by examiner

HITLESS SOFTWARE UPGRADE FOR A VIRTUALIZED GATEWAY COORDINATING MULTIPLE SMALL CELL RADIO ACCESS NETWORKS

CROSS REFERENCE TO RELATED APPLICATION

This application is non-provisional of U.S. Provisional Application Ser. No. 62/132,094, filed Mar. 12, 2015 entitled "Hitless Software Upgrade For a Virtualized Gateway Coordinating Multiple Small Cell Radio Access Networks" This application is also related to U.S. patent application Ser. No. 15/059,235, filed Mar. 2, 2016 entitled "Gateway Coordinating Multiple Small Cell Radio Access Networks", the contents of which are incorporated herein by reference in their entirety.

BACKGROUND

Operators of mobile systems, such as Universal Mobile Telecommunications Systems (UMTS) and its offspring including LTE (Long Term Evolution) and LTE-Advanced, are increasingly relying on wireless small cell radio access networks (RANs) in order to deploy indoor (as well as dense outdoor) voice and data services to enterprises and other customers. Such small cell RANs typically utilize multiple-access technologies capable of supporting communications with multiple users using radio frequency (RF) signals and sharing available system resources such as bandwidth and transmit power.

One type of RAN architecture that is currently deployed includes a network of radio nodes connected to a centralized access controller or aggregation node. One example of such a controller or node is the Services Node available from Spidercloud, Wireless Inc. The centralized Services Node provides a number of advantages that help meet stringent key performance indicator (KPI) requirements. It also has dedicated hardware that is used to provide frequency synchronization between radio nodes in order to facilitate UMTS and LTE airlink performance.

SUMMARY

In accordance with one aspect of the subject matter described herein, a method is provided for upgrading an access controller that controls and coordinates a plurality of radio nodes (RNs) each associated with a cell in a cluster of cells belonging to a radio access network. In accordance with the method, a new access controller that is to replace a current access controller currently controlling and coordinating the plurality of radio nodes (RNs) cell in the cluster is initialized. A most lightly loaded one of the plurality of RNs is identified. All UEs currently attached to the identified RN is caused to be handed off to a neighboring cell in the cluster After all the UEs have been handed-off from the identified RN, the identified RN is rebooted so that it is being controlled and coordinated by the new access controller. The steps of causing the UEs to be handed-off and rebooting the identified RN are repeated for a second one of the plurality of RNs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

A centralized access controller or aggregation node may be implemented as an enterprise premise-based controller element that coordinates a group of radio nodes (RNs). In an LTE embodiment, the access controller functions as a local, premise-based gateway that anchors and aggregates a group of LTE RNs. As previously mentioned, one particular example of such an access controller is the Spidercloud Services Node. Details concerning the Spidercloud Services Node may be found in U.S. Pat. No. 8,982,841, which is hereby incorporated by reference in its entirety.

The use of the Spidercloud Services Node achieves a number of advantages. For instance, by presenting a services node and an entire group of RNs controlled by the SN as a single virtual evolved Node B (eNB) to the core network, the complexity associated with aggregating and controlling a large number of RNs (performed by the services node) is hidden from the Evolved Packet Core (EPC). Hiding such complexity is particularly important as the number of small cells is likely to significantly exceed the number of LTE macrocellular eNB's, which drives the dimensioning of EPC equipment pools. Second, mobility between the individual RNs controlled by an SN is completely handled at a local enterprise gateway level, thus significantly reducing mobility-related signaling from impacting the MME pool in the EPC.

While the advantages of having a centralized access controller or aggregation node such as the Spidercloud Services Node have proven to be important, it is generally only well-suited for certain types of deployment. At the low end of the pyramid, deployments that require only a handful of radio nodes do not justify the additional cost incurred by installing a services node in the enterprise. At the high end of the pyramid, deployments that require thousands of radio nodes cannot be serviced because of scaling limitations in the current E-RAN software. However, as the number of small cells increases exponentially in the future, it may be advantageous to provide a scalable solution to deploy and manage those small cell systems with reduced capital and operating expenses.

To address this problem, an E-RAN gateway architecture is shown herein which can be scaled to support all sizes of deployments, either within the enterprise, inside the operator's network, or in the cloud.

Moreover, virtualization is seen as an important trend in the telecommunications industry with large mobile operators committing to transform network functions running on dedicated and proprietary hardware to commercial off the shelf equipment running virtualized network functions. Accordingly, in some implementations the gateway architecture described herein may reside on a virtual machine platform, thus eliminating the need for specialized hardware.

Operating Environment

Figure 1:
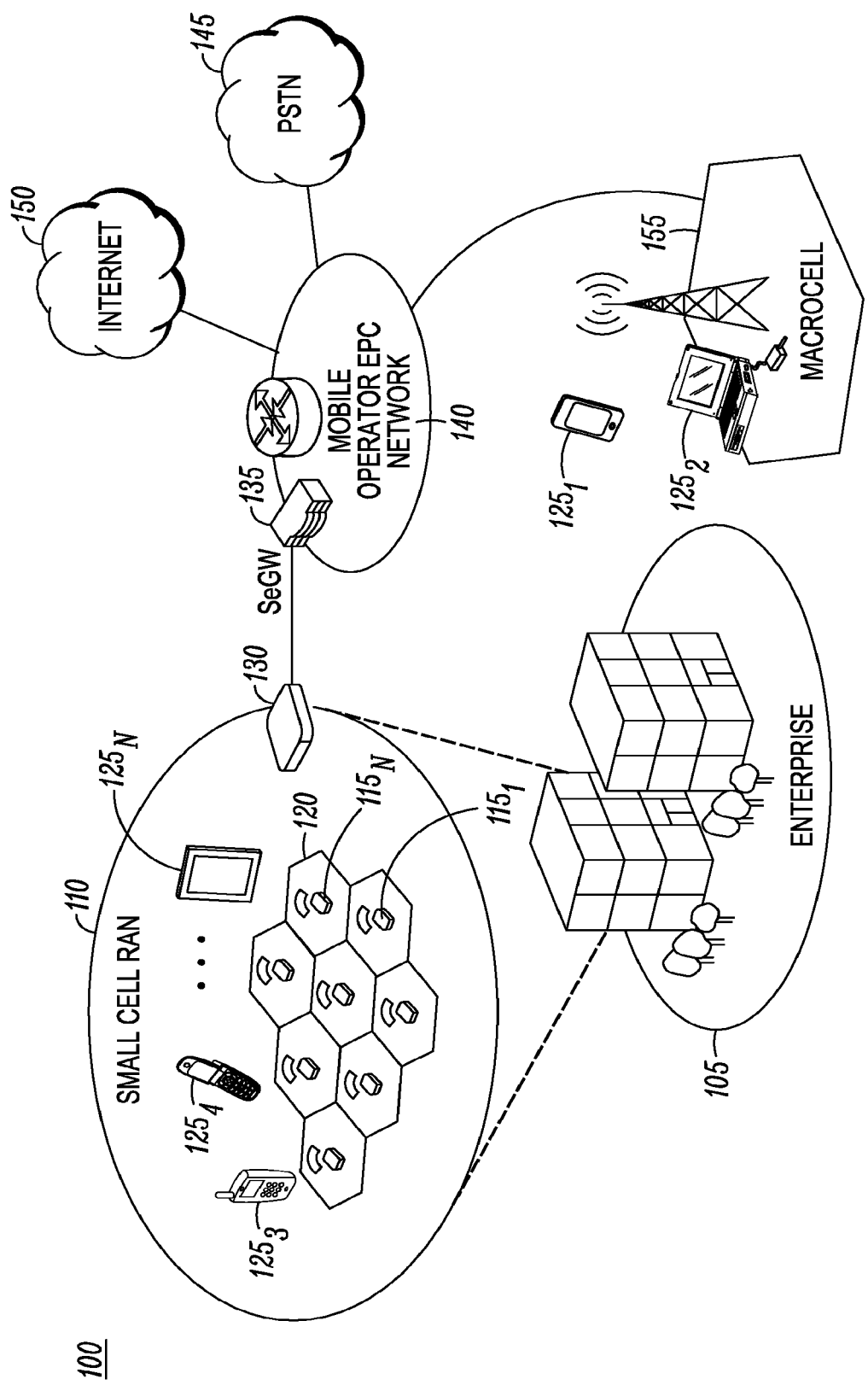
FIG. 1 shows a known mobile telecommunications environment that includes an enterprise in which a small cell RAN is implemented.

FIG. 1 shows a known mobile telecommunications environment 100 that includes an enterprise 105 in which a small cell RAN 110 is implemented. The small cell RAN 110 includes a plurality of radio nodes (RNs) 115 1 . . . 115N. Each radio node 115 has a radio coverage area (graphically depicted in the drawings as hexagonal in shape) that is commonly termed a small cell. A small cell may also be referred to as a femtocell, or using terminology defined by 3GPP as a Home Evolved Node B (HeNB). In the description that follows, the term "cell" typically means the combination of a radio node and its radio coverage area unless otherwise indicated. A representative cell is indicated by reference numeral 120 in FIG. 1.

The size of the enterprise 105 and the number of cells deployed in the small cell RAN 110 may vary. In typical implementations, the enterprise 105 can be from 50,000 to 500,000 square feet and encompass multiple floors and the small cell RAN 110 may support hundreds to thousands of users using mobile communication platforms such as mobile phones, smartphones, tablet computing devices, and the like (referred to as "user equipment" (UE) and indicated by reference numerals 125 1-125N in FIG. 1).

The small cell RAN 110 includes an access controller 130 that manages and controls the radio nodes 115. The radio nodes 115 are coupled to the access controller 130 over a direct or local area network (LAN) connection (not shown in FIG. 1) typically using secure IPsec tunnels. The access controller 130 aggregates voice and data traffic from the radio nodes 115 and provides connectivity over an IPsec tunnel to a security gateway SeGW 135 in an Evolved Packet Core (EPC) 140 network of a mobile operator. The EPC 140 is typically configured to communicate with a public switched telephone network (PSTN) 145 to carry circuit-switched traffic, as well as for communicating with an external packet-switched network such as the Internet 150.

The environment 100 also generally includes Evolved Node B (eNB) base stations, or "macrocells", as representatively indicated by reference numeral 155 in FIG. 1. The radio coverage area of the macrocell 155 is typically much larger than that of a small cell where the extent of coverage often depends on the base station configuration and surrounding geography. Thus, a given UE 125 may achieve connectivity to the network 140 through either a macrocell or small cell in the environment 100.

Figure 2:
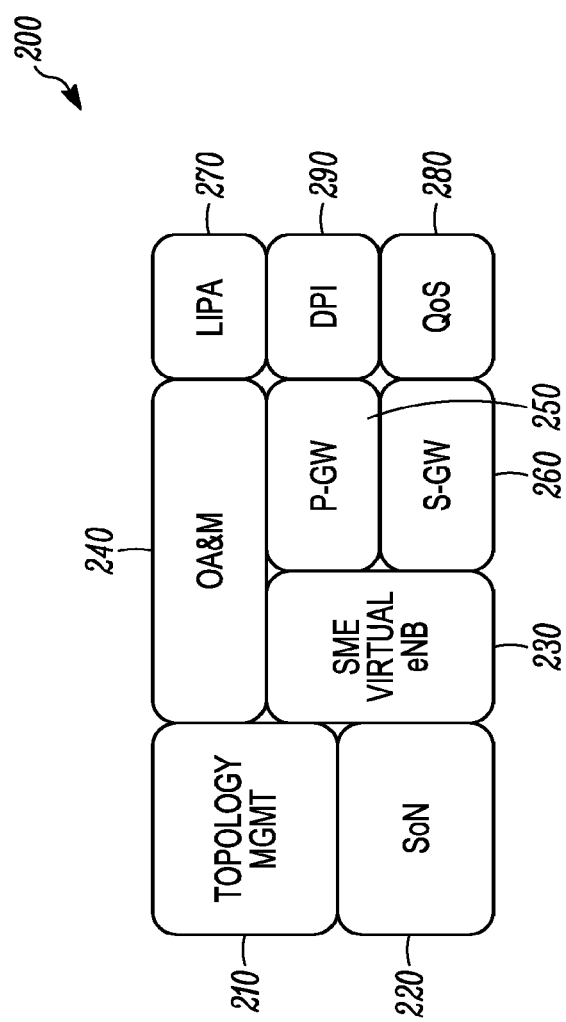
FIG. 2 shows a functional block diagram of one example of an access controller such as the Spidercloud Services Node.

As previously mentioned, the access controller shown above may be the Spidercloud Services Node, available from Spidercloud Wireless, Inc. FIG. 2 shows a functional block diagram of one example of an access controller 200 such as the Spidercloud services node. The access controller may include topology management 210, self-organizing network (SON) 220, a services node mobility entity (SME) 230, an operation, administration, and management (OAM) module 240, a PDN GW/PGW module 250, a SGW module 260, a local IP access (LIPA) module 270, a QoS module 280, and a deep packet inspection (DPI) module 290. Alternative embodiments may employ more or less functionality/modules as necessitated by the particular scenario and/or architectural requirements.

Cloud-Based Gateway

As mentioned above, an access controller is generally suitable for a small cell RAN 110 that includes anywhere from several (e.g. 8) cells 120 up to about 100 or so cells 120. RANs that include fewer than several cells 120 are typically too small to make the cost of the access controller economical. Likewise, RANs that include more than about 100 cells can be difficult to coordinate with a single access controller.

One way to address those environments in which the use of an access controller is impractical, either because it includes too few or too many cells, is to move the functionality of the access controller from the enterprise 105 to a cloud-based gateway that may be located, for example, in the mobile operator's core network. Alternatively, the cloud-based gateway may be located elsewhere and operated by a third party (e.g., an entity other than the mobile operator or the enterprise).

Figure 3:
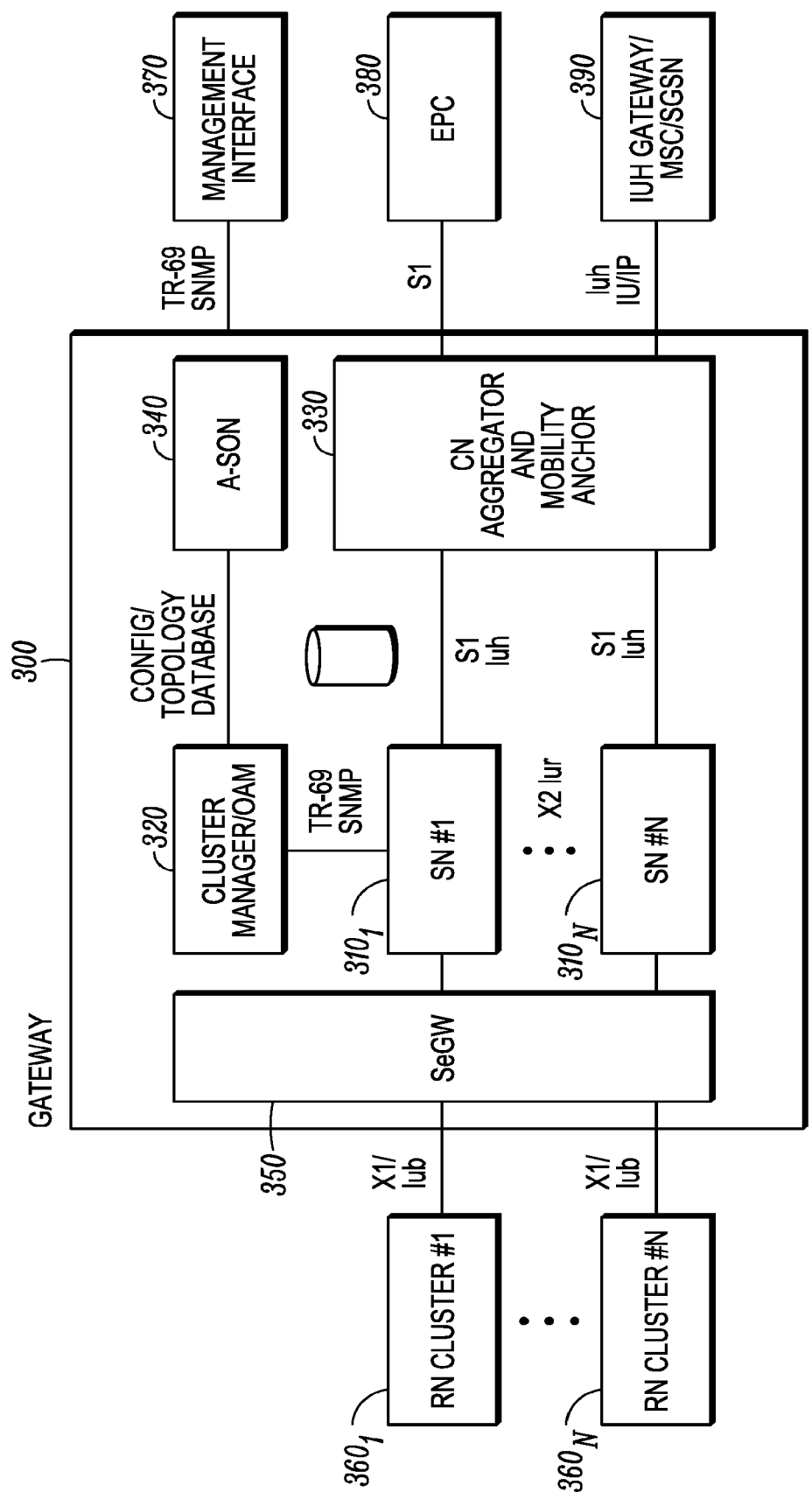
FIG. 3 shows a functional block diagram of one example of a gateway that operates between a series of RANs and a core networks.

FIG. 3 shows a functional block diagram of one example of a gateway 300 of the type described above. The gateway 300 includes multiple instances of a services node (SN) $310_1, 310_2 \ldots 310_n$ ("310"), cluster manager and operations/administration module (OAM) 320, an aggregated SON (A-SON) module 340 and a core network (CN) aggregator and mobility anchor 330. It should be appreciated that the gateway 300 shown in FIG. 3 is only one example of such a gateway and that it may have more or fewer components than shown, may combine two or more components, or it may have a different configuration or arrangement of components. In some implementations the components of the gateway 300 may be run as a virtual application residing on a virtual machine platform. In this way the software will be agnostic to the underlying hardware provided that a virtual machine layer lies between them. More generally, however, the various components shown in FIG. 3 may be implemented in hardware, software or a combination of both hardware and software. Additionally, in some cases the gateway 300 may also be practiced in a distributed computing environments where certain tasks are performed by remote processing devices that are linked through a communications network.

If the components of the gateway 300 are run as a virtual application, then in some implementations the gateway 300 may employ a Network Function Virtualization (NFV) architecture. NFV refers to an architecture for telecommunication services as published by the European Telecommunications Standards Institute (ETSI) in a series of documents available from the ETSI website (See Network Functions Virtualization (NFV); Infrastructure Overview, ETSI GS NFV-INF 001 V1.1.1 (2015-01), http://www.etsi.org/deliver/etsi_gs/NFV-INF/001.sub.--099/001/01.01.01.su-b.--60/gs_NFV-INF001v010101p.pdf). NFV uses a generic hardware platform and software adapted for the generic hardware platform. Thus, NFV creates a network that can be more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on a wide variety of generic hardware processing platforms (e.g., x86 based hardware). Therefore, VNFs may be installed, removed, and moved between hardware facilities much more easily, less costly and thus, more frequently.

Referring again to FIG. 3, each instance of the services node 310 provides the functionality of an access controller of the type described above and serves a single small cell RAN, which is shown as a radio node (RN) cluster. For example, as shown, SN $310_1$ serves RN cluster $360_1$ and SN $310_N$ serves RN cluster $360_N$, both via the optional security gateway 350. The RNs in the clusters may communicate with the security gateway 350 over a proprietary X1/Iub' connection. The SNs 310 may communicate with one another over conventional protocols using, for example, X2/Iur connections. The remaining gateway components shown in FIG. 2 allow the aggregation of the services nodes 310 and provide intra-small cell coordination such as UE handovers between the nodes and coordination of the d-SON functionality provided by each individual services node 310.

Thus, each instance of the SN 310 acts as a serving controller to one or more RN clusters and each SN 310 acts as a control point for all radio nodes in the radio node cluster. As the number of RN clusters increase, new instances of the SN 310 can be created to meet the requirements. While in principle there is no limit on the number of SN instances that are allowed, in practice it will depend on constraints such as CPU, memory, networking interfaces and so on. Each SN is responsible for 3G and LTE Radio Resource Management (RRM) of all the RN clusters to which it is connected and admission control of RRC Connections. In addition, the SN is responsible for coordinating RF parameters using Localized SON (e.g., d-SON) and for coordinating the mobility of RNs within or between clusters. Since the architecture of each SN supports centralized layer L3 (RRC/RRM) processing, it is able to provide a wide variety of features. For instance, each SN can provide centralized admission control that enables the SN to re-direct low priority users to other cells. In addition, each SN can provide fast handovers since they are completely hidden from the EPC. The SNs can also perform LTE RRC Reestablishment procedures across cells and RANs and, furthermore, they can support soft handovers in UMTS. The SNs can also optimize LTE call setup times by combining and/or piggybacking multiple control plane messages between a radio node and a SN, which is required in high latency backhaul networks.

As previously mentioned, the SNs 310 may communicate with one another over conventional protocols using, for example, X2/Iur connections. Communication between the SNs 310 and the cluster manager/OAM 320 may also employ conventional protocols such as SNMP/TR-069. Likewise, the SNs 310 and the CN aggregator/mobility anchor 330 may employ conventional protocols such as Iuh (for UMTS) and S1 (for LTE over SCTP/IP). Of course, alternative protocols may be employed instead, including both standard and proprietary protocols.

Figure 4A:
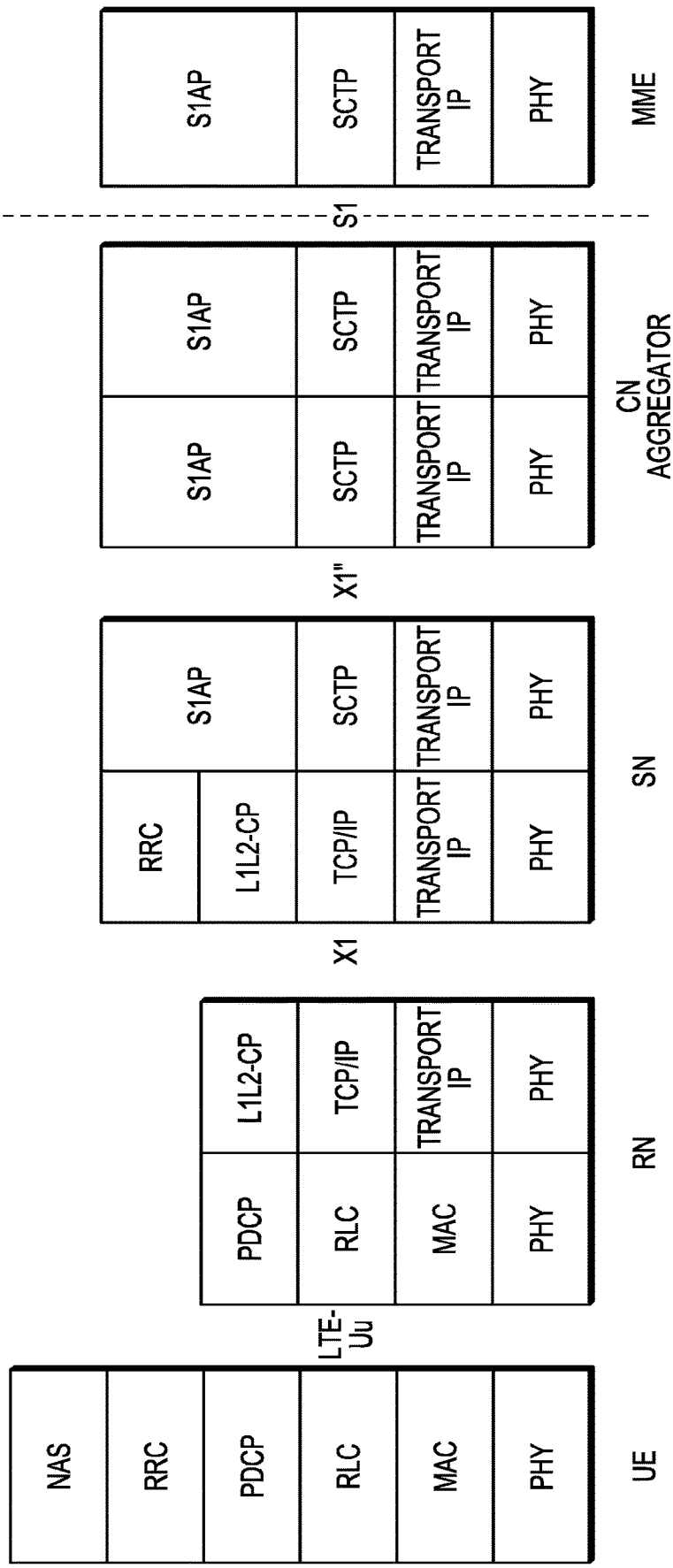
FIGS. 4A and 4B shows one example of a protocol stack that may be employed for the control plane and the user plane, respectively, in an environment that includes the gateway of FIG. 3 in terms of the OSI (Open Systems Interconnection) model of logical layers.
Figure 4B:
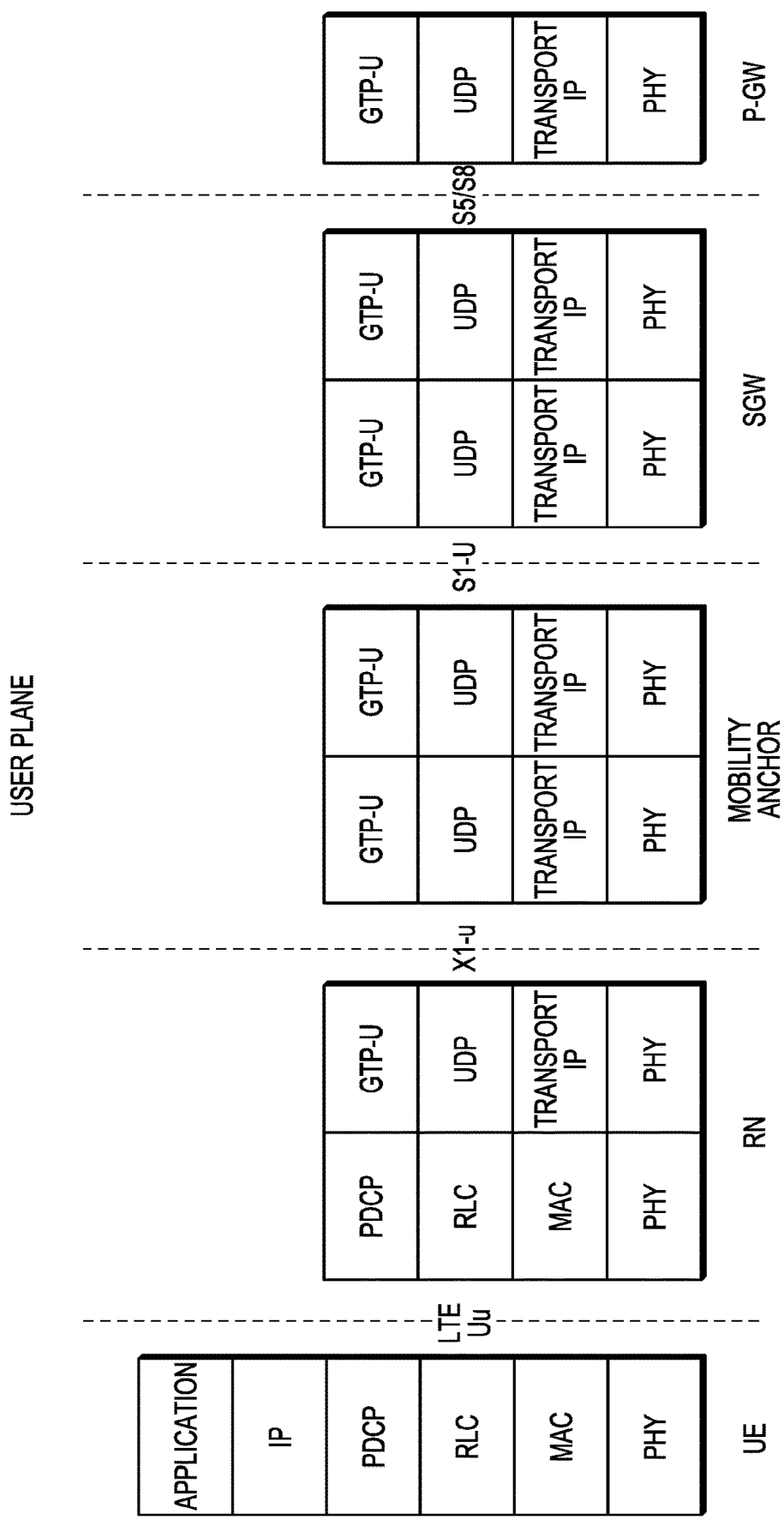

FIGS. 4A and 4B shows one example of a protocol stack that may be employed for the control plane and the user plane, respectively, in an environment that includes the gateway of FIG. 3 in terms of the OSI (Open Systems Interconnection) model of logical layers. As is known in the art, the Non-Access Stratum (NAS) layer protocol is responsible for signaling and traffic between UE and the network for control purposes such as network attach, authentication, setting up of bearers, and mobility management. The S1 Application Protocol Layer (S1AP) supports the various functions of the S1 interface. The Stream Control Transmission Protocol (SCTP) is a transport protocol for exchanging data that provides a reliable transport service over IP and operates at the equivalent level of UDP and TCP. The Radio Resource Control (RRC) protocol is responsible for control plane signaling between a UE and the network, i.e. such tasks as broadcast of system information; establishment, maintenance and release of RRC connection; establishment, configuration, maintenance and release of signaling and data radio bearers; security functions including key management; mobility functions such as control of UE cell selection/ reselection; paging; UE measurement configuration, processing and reporting; handover; quality of service (QoS) management functions; UE measurement reporting and control of the reporting, but not exclusively. The Packet Data Control Protocol (PDCP) layer is responsible for (de-)compressing the headers of user plane IP packets. The Radio Link Control (RLC) layer is used to format and transport traffic and a Medium Access Control (MAC) layer provides addressing and channel access control mechanisms. The physical (PHY) layer, translates logical communication requests into hardware-specific operations such as modulation, bit synchronization, multiplexing, equalization, forward error correction etc.

Protocol layers that may be employed in the control plane between the mobility anchor and the RNs and between the mobility anchor and the SGW in the core network may include a Transport Internet Protocol (IP) layer, a user datagram protocol (UDP) and a GPRS Tunneling Protocol-User plane (GTP-U) for creating IP-based tunnels. It should be noted that the X1, X1" and X1-u interfaces shown in FIG. 4 may be proprietary. The remaining interfaces may all be standard 3GPP interfaces.

In some embodiments each of the SNs may perform logical open systems interconnection (OSI) layer L3 processing. In some cases the SNs may also perform at least a portion of logical OSI layer L2 processing such as Packet Data Control Protocol (PDCP) processing, for example.

The cluster manager and operations/administration module (OAM) 320 shown in FIG. 3 provides a single provisioning point for the RN clusters. Among other things, the Cluster Manager/OAM provides authentication of radio nodes/clusters, self-discovery/radio node join procedures and software license management. The cluster manager/OAM module 320 also manages SN start-up and stop, redirects newly joining radio nodes to a particular RN cluster and redirects RNs to a specific SN instance. These tasks can be performed using topology discovery information obtained by the A-SON module 340 and the session load on the SN. In the event of a hardware or software failure within the gateway 300, the cluster manager/OAM module 320 can redirect RN clusters to new SN instances. The cluster manager/OAM module 320 may communicate with the SNs using any of a variety of protocols such as the Broadband Forum Technical Report 069 (TR-69) protocol, the Simple Network Management Protocol (SNMP), and the like.

In one implementation, the self-discovery/radio node join procedure may proceed as follows. A radio node is pre-provisioned with the fully qualified domain name (FQDN) of the gateway 300. When an RN boots up, it performs a Domain Name System (DNS) resolution process to obtain the IP address of the gateway 300. The RN then sends a Join Request message to the gateway 300 requesting a software image download from the cluster manager/OAM module 320. The cluster manager/OAM module 320 authenticates the RN and sends a Join Accept message upon successful authentication. The Join Accept message contains the SN information that is going to serve this RN such as an identifier and IP address of the SN to which it is to connect and any necessary software needed to establish that connection. The cluster manager/OAM module 320 selects the SN instance that is to serve this particular RN based on a variety of factors ("signatures") that may include, without limitation, the geographic location of the RN (e.g., GPS coordinates, physical address, RF topology, IP address), the results of the topology discovery process performed by the A-SON module 340 and load balancing considerations based on the current load of the SNs.

The cluster manager/OAM module 320 can initiate the launch of a new SN instance when needed. For instance, in the event of an unrecoverable failure at a SN, the cluster manager/OAM module 320 can redirect a cluster to a different SN instance or launch a new SN instance. Based on the current load, the cluster manager/OAM module 320 can offload some of the SNs and change the cluster configuration. The cluster manager/OAM module 320 can also support additional features such as location locking. For example, an RN may be factory-provisioned so that it is only operable at a fixed location.

The core network (CN) aggregator and mobility anchor module 330 shown in FIG. 3 acts as the interface between the gateway 300 and the core network. The CN aggregator in the CN aggregator and mobility anchor module 330 takes the individual SN connections and combines them into a single connection that is directed to the Evolved Packet Core (EPC) 380 of the mobile operator. That is, the CN aggregator aggregates the core facing interfaces of the SNs to a single interface towards the EPC 380. It also provides a single Iuh connection between the SNs and the core network, specifically the mobile switching center (MSC) 390 for circuit-switched calls and the serving GPRS support node (SGSN) 390 for packet-switched calls. In particular, for UMTS networks the CN aggregator connects to a Home Node B Gateway (HNBGW) using Iuh/SCTP protocols. It can also connect to a pool of LTE MMEs using S1AP/SCTP protocols by providing one S1AP/SCTP connection to each MME. The MMEs to which it connects may belong to a single operator or multiple operators. The CN aggregator can connect to each individual SN using an S1AP/SCTP interface for LTE and an Iuh/SCTP interface for UMTS. The CN aggregator can also support Iu-Flex and S1-flex features and provide optimization for local area code (LAC)/routing area code (RAC) and tracking area code (TAC) planning and for paging.

The mobility anchor in the CN aggregator and mobility anchor module 330 hides from the core network all mobility events between the RN clusters and mobility events between SNs. All data plane traffic for LTE and UMTS terminate at the mobility anchor. The mobility anchor also provides soft handover functionality between RN clusters and manages PSC/PCI hand-in disambiguation across RN clusters when UEs move from the macro network to the small cell network and need to be assigned to an RN cluster. The mobility anchor can also provide GTP anchoring between the RNs and the EPC.

As noted above, the individual SNs each include Self-Organizing Network (SON) functionality, which facilitates automation of self-configuration, self-management, self-optimization and self-healing of the individual RN clusters. SON is an automation technology designed to make the planning, configuration, management, optimization and healing of mobile radio access networks simpler and faster. SON functionality and behavior has been defined and specified in generally accepted mobile industry recommendations produced by organizations such as 3GPP (3rd Generation Partnership Project) and the NGMN (Next Generation Mobile Networks). SON features are available for both LTE and UMTS. Typically, each SN 310 operates in a distributed SON (d-SON) architecture mode. Thus, the SN 310 configures and optimizes the cluster with which it is associated. When a new RN is added, it discovers the SN. From that point on, the SN takes responsibility for providing the RN with its software image and radio configuration. If an RN inside the cluster drops off the network, the SN servicing it adjusts the configuration of neighboring RNs to fill the coverage hole.

The A-SON module 340 shown in FIG. 3 is used to coordinate the actions of the various d-SON elements in each of the SNs 310 using a hierarchical structure to ensure that there is seamless SON functionality across the SNs. Using only limited topology information, the A-SON module 340 can group RNs into RN clusters and identify which clusters can undergo distributed SON simultaneously. In particular, the A-SON module 340 can solve a number of problems related to the discovery and management of the network topology for clusters of small cells. The problems that are addressed include: (1) how to accurately build network topology information for the boundary cells of each cluster, which see not only overlay macro cells but also boundary cells of other clusters that are deployed in the proximity and (2) how to update the network topology when some cells change their configurable parameters.

The A-SON module 340 can perform a variety of tasks. For instance, it can allocate physical cell identifiers (PCI) and primary scrambling codes (PSC) and their reuse across RN clusters associated with different SNs. The A-SON module 340 can also dynamically allocate transmit power assignments of radio nodes, perform closed loop monitoring of inter-SN mobility KPIs, dynamically update the neighbor topology and the neighbor tables maintained by the SNs and detect RF coverage overlaps and holes between cells. Mobility Robustness Optimization (MRO) and Mobility Load Balancing (MLB) may also be performed by the A-SON module 340.

The individual d-SON elements in the RN clusters cooperate with the A-SON module 340 to perform a number of tasks, including coordinating the SON configurations as received from A-SON module 340, providing periodic measurements and KPIs to the A-SON module, and dynamic fractional frequency reuse (FFR) assignments within the SNs, which may be based, for example, on the number of cell edge users and cell center users in the RNs served by the respective SNs at any given time. The d-SON elements also perform over the air frequency and phase synchronization of the RNs with other RNs and macro cells, when possible.

As further shown in FIG. 3, a management interface 370 to the gateway 300 may be provided which allows network operators to manage multiple small cell systems. The management interface is a centralized configuration, fault, and performance management system. Communication between the management interface 370 and the gateway 300 may be accomplished using, for example, a TR-69 or SNMP connection.

In some implementations the gateway 300 may operate as a multimode gateway supporting two or more bands. For example, one band may operate in accordance with LTE standards and the other may operate in accordance with UMTS standards. Accordingly, the gateway 300 can support clusters in which independent LTE and UMTS small cells are co-located, each being served by a dual or multi-mode RN.

A multimode gateway may be employed in a variety of different circumstances. For instance, a network operator may deploy the system and reserve one of the bands for themselves and lease the other band to another network operator. Alternatively, a third party may own and deploy the multimode network. In either case, each network operator wants to use their own core network. In such a case the CN aggregator may have multiple S1 connections to the different core networks of the operators. Additionally, each dual (or multi) mode RN may have two (or multi) dedicated proprietary X1 connections to the SNs, each representing a different operator. From the operators' perspective, there appears to be a SN and a set of RNs dedicated to each operator, although the different SNs may reside on a common hardware platform. To provide this capability the SNs are provided with functionality that allows each operator to configure their cells independently of the other.

In some cases the multimode gateway can facilitate cooperation among the different network operators. The different operators would be aware of the shared resources (e.g., RNs and all or various subcomponents of a SN) and would allow information to be shared between them in order to allow joint optimization of the coverage and capacity for UEs supported by the different operators.

Figure 5:
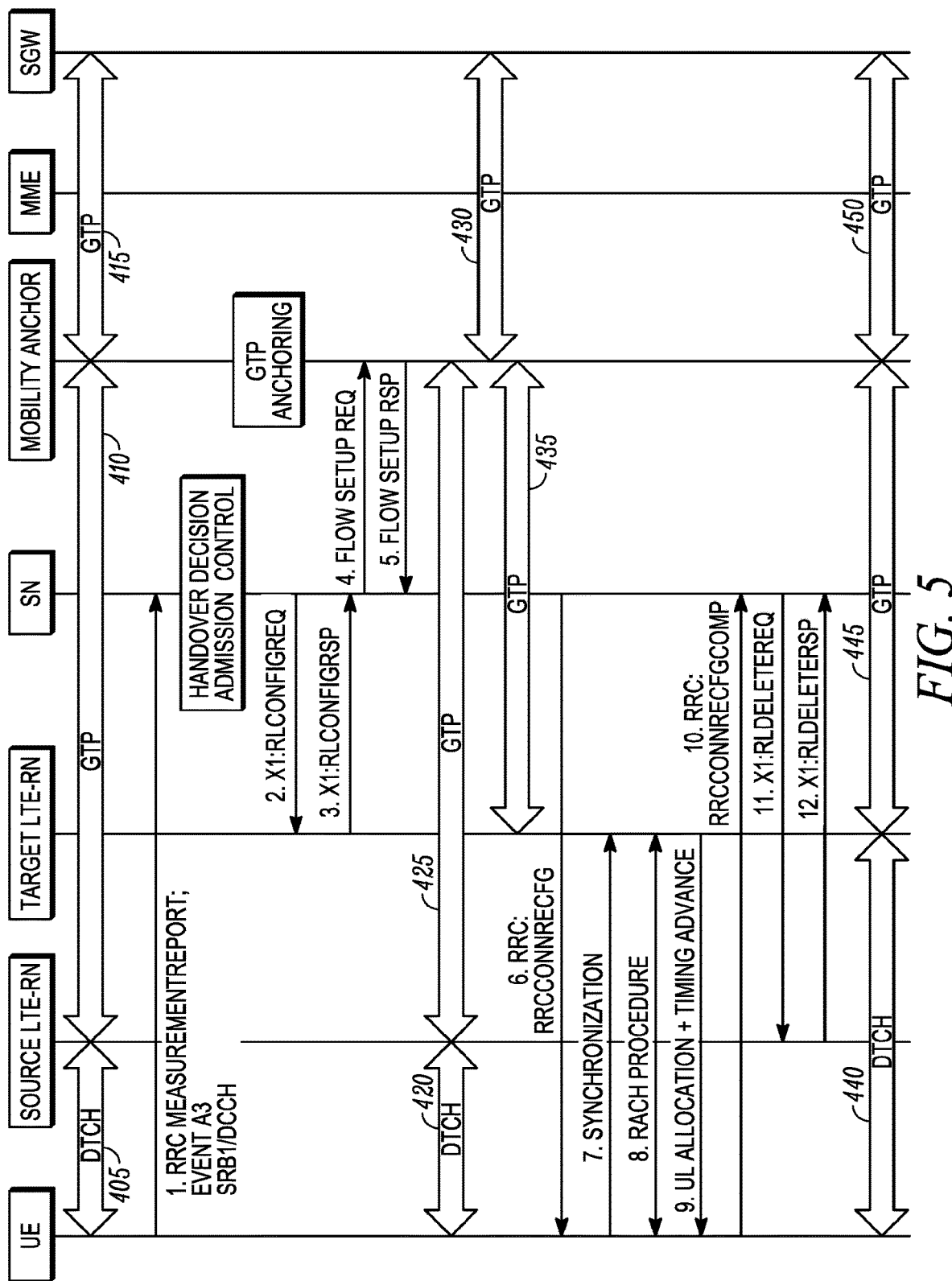
FIG. 5 shows a message flow diagram of an LTE intra-SN handover in which a UE connected to a source RN is handed-over by the gateway shown in FIG. 3 to a new RN (the target RN).

FIG. 5 shows a message flow diagram of an LTE intra-SN handover in which a UE connected to a source RN is handed-over by the gateway to a new RN (the target RN). Initially, the UE is connected to the source RN over a logical dedicated transport channel (DTCH), indicated by arrow 405, which is used to carry all traffic between a UE and an RN. The source RN, in turn, uses the GPRS tunneling protocol (GTP), indicated by arrow 410, to carry uplink user traffic and transport it from the Source RN to the mobility anchor in the CN aggregator and mobility anchor. Likewise, the mobility anchor, which aggregates all GTP traffic received from, and destined for, the various RNs, forwards the uplink user traffic, indicated by arrow 415, to the SGW in the core network using GTP. Similarly, downlink user traffic is received by the mobility anchor from the SGW and establishes a new GTP tunnel over which the traffic is forwarded to the source KIN, which in turn forwards the traffic to the UE over the DTCH.

With continuing reference to FIG. 5, the source RN receives at 1 a Radio Resource Control (RRC) measurement report. There are multiple measurement report triggering events defined for an LTE cellular network. When the criteria or conditions defined for a triggering event are satisfied, the UE will generate and send a measurement report to its serving cell RN. In this case the UE sends a measurement report upon the occurrence of an A3 event, which indicates that the UE is receiving a stronger signal from a neighboring cell than the current serving cell. That is, in this case the RRC measurement report indicates that the UE is receiving a stronger signal from the target RN than the source RN. The source RN forwards the RRC measurement report to the SN with which it is associated.

Based on the measurement report, the SN decides to perform a handover from the source RN to the target RN. In this example both the source and target RNs are associated with the same SN instance. In response, at 2, the SN uses the UE context information to set up a radio link between the SN and target RN using the X1 interface by sending a radio link configuration request. At 3, the target RN responds with a radio link configuration response. In this way the target RN is prepared by the SN for the handover of the UE. After the target RN has been prepared, the SN sends a flow setup request at 4 to the mobility anchor. In this way the SN interacts with the mobility anchor to establish a new GTP tunnel between the target RN and mobility anchor. The mobility anchor responds with a flow setup response at 5.

At this point all GTP information has been exchanged that is needed to set up a tunnel between the mobility anchor and the target RN, but no traffic is being communicated on that tunnel yet. That is, as indicated by arrows 420, 425 and 430, all user traffic is still going through the source RN. Next, as indicated by arrow 435, GTP traffic also starts flowing from the mobility anchor to the target RN as well as source RN. Subsequently, the mobility anchor stops sending GTP traffic to the source RN. Thus, all downlink data destined for the UE now comes from the SGW to the mobility anchor, and then to the target RN, which at this point is simply buffering the traffic. All uplink traffic, however, is still going through the source RN, to the mobility anchor and then to the SGW.

Next, at 6 the SN sends a RRC connect reconfiguration request to the UE instructing it to switch to the target RN. At 7-9, a conventional exchange of messages occurs between the UE and the target RN to synchronize the UE and the target RN. For instance, the UE undergoes at 8 a Random Access Channel (RACH) procedure over a logical RACH channel in order to attach to the target RN. Likewise, at 9 the target RN responds with the UL allocation and timing advance information.

At this point the UE is now synchronized with the target RN and at 10 the UE sends a RRC connection reconfiguration complete message to the SN. From a layer 3 signaling point of view, the handover is now complete. Finally, at 11 the SN uses the X1 interface to send a radio link delete request to the source RN and at 12 the source RN acknowledges by sending the SN a radio link delete response. The target RN now sends the buffered user traffic to UE over the DTCH, as indicated by arrow 440. Accordingly, uplink and downlink traffic can now be communicated between the UE and target RN using DTCH and between the target RN and mobility anchor using GTP (arrow 445), as well as between the mobility anchor and the SGW using GTP (arrow 450).

As the message flow chart in FIG. 5 illustrates, an intra-SN UE handover can be performed in a manner that is transparent to the core network since all mobility-related messages terminate at the mobility anchor.

Figure 6:
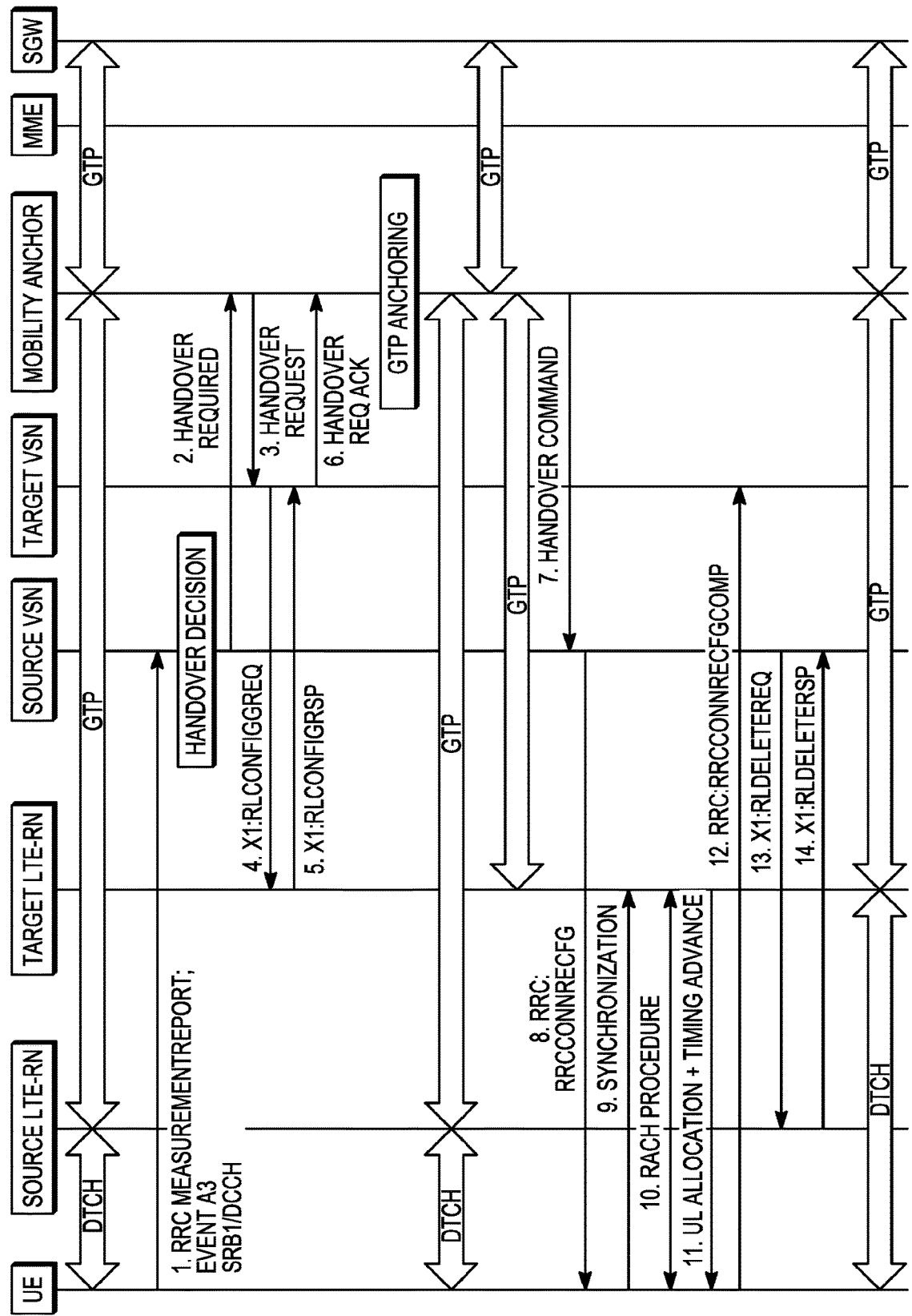
FIG. 6 shows a message flow diagram of an LTE inter-SN handover in which a UE connected to a source RN associated with one SN instance is handed-over to a new RN (the target RN) that is associated with a different SN instance in the gateway of FIG. 3.

Similar to FIG. 5, FIG. 6 shows a message flow diagram of an LTE inter-SN handover in which a UE connected to a source RN associated with one SN instance is handed-over to a new RN (the target RN) that is associated with a different SN instance in the gateway.

The primary difference between the messages that are exchanged in the inter-SN handover of FIG. 5 compared to the intra-SN handover of FIG. 6 is that in FIG. 6 the layer 3 context is moved from one SN instance to another SN instance. This occurs when the source SN determines that the target RN is associated with a different SN. Unlike in FIG. 5, this transfer between SN instances requires communication between the source and target SN instances via the mobility anchor.

In the following only those messages that are different from those shown in FIG. 5 are discussed. As in FIG. 5, the UE is initially attached to the source RN, which is associated with the source SN.

As shown in FIG. 6, after the source SN decides to perform a handover from the source RN to the target RN, the source RN sends a handover request at 2 to the mobility anchor. In response, at 3 the mobility anchor sends a handover request to the target SN, identifying to it the source SN, the source RN, and the UE. When the target SN receives the handover request at 3, it prepares the radio link as it did before at 4-5. After the radio link has been successfully configured, at 6 the target SN acknowledges the handover by sending handover request acknowledgement to the mobility anchor, indicating that it is ready for UE attachment. The mobility anchor then sets up a GTP tunnel between it and the target RN. At 7 the mobility anchor sends a handover command to the source SN indicating that the request has been fulfilled. As before, the source SN sends the UE at 8 an RRC connect reconfiguration, which contains the information it needs concerning the target RN. The remaining synchronization and other message exchanges proceed as in FIG. 5.

Access Controller Software Upgrade

When one of the SNs 310 needs a software upgrade, the usual procedure is to schedule a maintenance window during which time the system will not be available. While this may be acceptable for some small cell deployments, for certain deployments, 24/7 operation of the small cell network is expected. For example, a hospital building with little or no macro penetration generally required uninterrupted operation.

To address this problem, the following software upgrade procedure may be used, which will have minimal impact on the end users. It should be noted that while the following example is illustrated in the context of the virtualized gateway in which the SN software needs to be upgraded, the invention is more generally applicable to any small cell radio access network (RAN) in which software in the access controller needs to be upgraded. Moreover, the procedure assumes no macro coverage is available. However, the availability of macro coverage can speed up the procedure.

As described below, individual cells in the cluster are transferred to the new SN one at time after all the UEs connected to the cell being transferred are handed over to neighboring cells.

Figure 7:
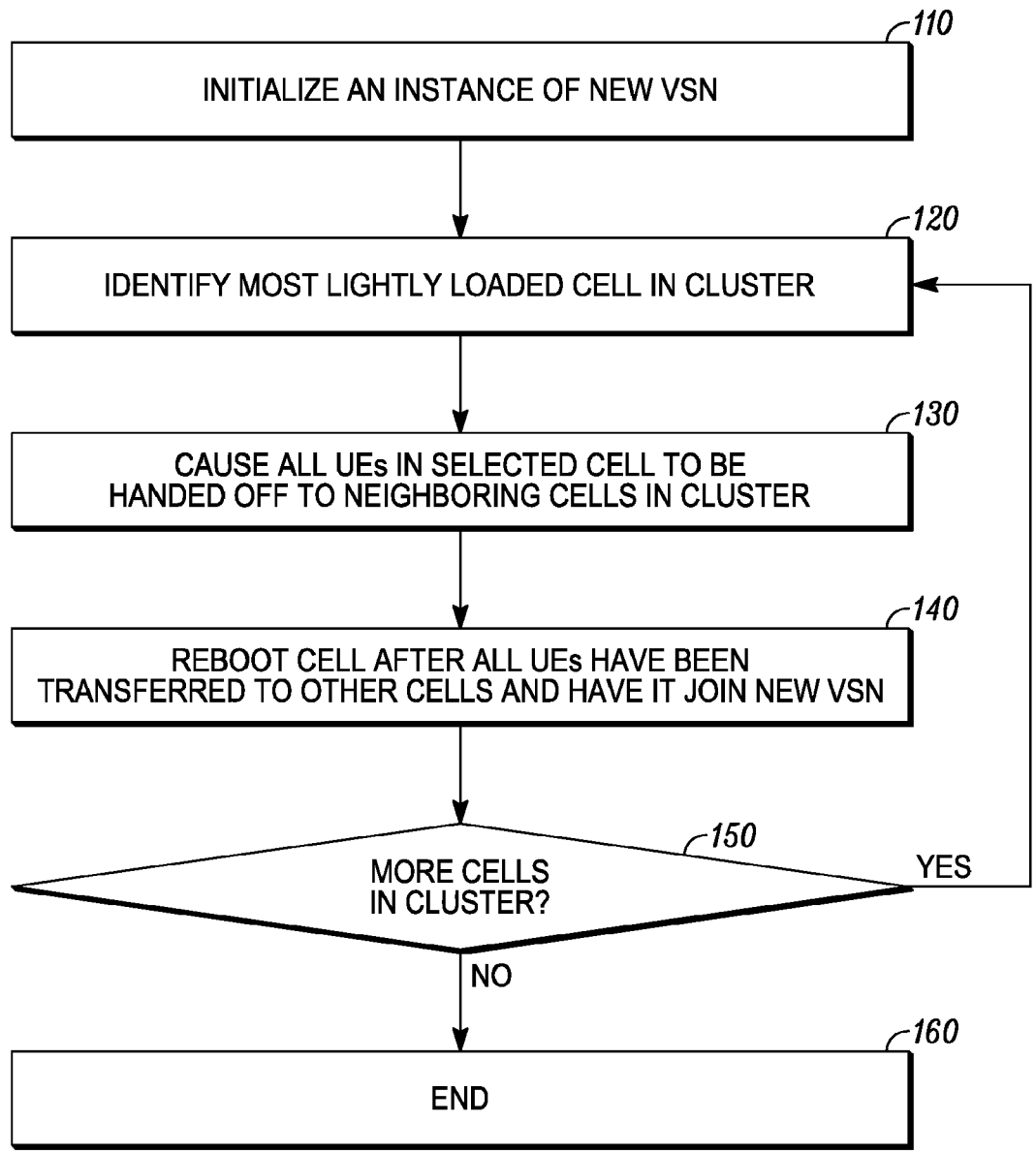
FIG. 7 is a flowchart illustrating one example of a method for upgrading the software employed by one of the access controllers in the gateway of FIG. 3

The process will be illustrated with reference to the flowchart shown in FIG. 7. In this case the currently operating SN software is to be upgraded. First, in step 110 a virtual instance of the new SN software is started. This process can be initiated, for example, by the cluster manager/OAM 320. It should be noted that if the access controller is not operating in a virtual environment, the same process can be used by starting an upgraded real controller. The new controller inherits the configuration of the existing controller. At this time the new SN is not managing any small cells in the cluster. The instances of the new SN and the current SN can communicate through standard X2/Iur interfaces for both the control plane and the data plane.

Next, in step 120, the most lightly loaded cell in the cluster is identified. The current SN then initiates a process in step 130 that causes all the UEs that have an existing connection to that cell to be handed-off to other cells in the cluster. The manner in which this hand-off is accomplished will depend on whether the system is a UMTS based system or an LTE system.

For a UMTS based system, if a UE is not in a soft handover with another cell in the cluster, the UE is instructed to report the strongest cells it detects. Since all cells in the cluster are presumed to be connected, the UE should be able to report at least one such cell. For this purpose UE can be instructed to send, for instance, an Radio Resource Control (RRC) measurement report. Based on the UE report, the strongest reported cell is added to the active set of the UL, which specifies the radio links connected to the UE at any given time. Alternatively, or additionally, the transmit power of the cell can be gradually decreased in a stepwise manner so that ultimately all UMTS UEs are either in a soft handover with another cell or have been already handed over to another cell. If the strongest reported cell should happen to be managed by a different SN, a hard handover may be used to transfer the UE.

A similar procedure may be used in an LTE based system to hand-off all the UEs that have an existing connection to the most lightly loaded cell in the cluster, except that a hard hand-off is used instead of a soft handover. That is, the UEs connected to that cell are instructed to report the strongest detected cells and perform a hard handover to the strongest reported cell. Alternatively, or additionally, the transmit power of the cell can be gradually decreased in a stepwise manner so that ultimately all LTE UEs are handed over to another cell.

After all UEs have been transferred from the most lightly loaded cell to other cells, the process continues with step 140, in which the RN in the cell is rebooted. At the same time, the transmit power of the neighboring cells is increased to cover the hole created by having the most lightly loaded cell out of service. Since the only UEs connected to the cell at the time of the reboot were in a soft handover, the connections will not drop. Upon being rebooted the RN joins the new SN and downloads new software from it, if required. The RN then joins with its SN and becomes operational. Once the RN is booted up and operational, the process moves decision step 150 in which is determined if there are more cells in the cluster than need to be transferred from the current SN to the new SN. If there are more cells, the process returns to step 110 and is repeated by having the new SN inform the current SN to start the same procedure for a different cell. In some implementations the next cell that is chosen may be the next most lightly loaded cell. Finally, when all the cells have been transferred, the process ends at step 160.

All newly established UE connections on the upgraded cells will go directly from the new SN to the CN aggregator and mobility anchor 330. However, in some implementations if a UE connection is handed over from the current SN to the new SN, the core network path will continue to include the current SN. That is, the communication path will begin with the upgraded cell, continue through the new SN, the current SN, and then the CN aggregator and mobility anchor 330. Thus, after all cells have moved to the new SN, the current SN may still be providing the anchoring for UE connections on the new SN for the CN aggregator and mobility anchor 330. This is for UE connections that were handed over to the new SN but the connections have not restarted yet. The current SN can be decommissioned after such anchoring is no longer in use. This process can be expedited by forcefully terminating UE connections if they do not involve a voice call. The connections will automatically be re-initiated by the UE and the new connection will now go directly from new SN to the CN aggregator and mobility anchor 330.

Alternatively, in other implementations the current SN may be removed from the core network path as soon the UEs are transferred to the new SN. For instance, the new SN can inform the CN aggregator and mobility anchor 330 to switch the data path to itself if the UE was handed over from the old SN. The CN aggregator can then start forwarding any data for that UE to the new SN and accept data from the UE from the new SN. In this implementation a hard handover will always be used (in the case of UMTS) for transferring over a UE to a cell which is managed by the new SN. This way it can be ensured that the data path always goes through either the old SN or the new SN, but not both. The old SN can then be decommissioned as soon as all of the UE's connected to it have been transferred out to other SNs.

Various optimizations may be employed to speed up the upgrade process by, for example, picking multiple cells to simultaneously switch to the new SN such that each cell that is picked has at least N number of neighbors that are operational and which will not be picked in this current iteration.

Several aspects of telecommunication systems will now be presented with reference to gateway described in the foregoing detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable media. Non-transitory computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM) electrically erasable PROM (EEPROM), a register, a removable disk, and any other suitable media for storing software. The non-transitory computer-readable media may be resident in the processing system, external to the processing system, or distributed across multiple entities including the processing system. Non-transitory computer-readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

The invention claimed is:

1. A method of upgrading an access controller that controls and coordinates a plurality of radio nodes (RNs) each associated with a cell in a cluster of cells belonging to a radio access network, comprising:

(a) initializing a new access controller that is to replace a current access controller currently controlling and coordinating the plurality of radio nodes (RNs) each associated with the cell in the cluster of cells;

(b) causing all user equipments (UEs) currently attached to an RN identified to be the most lightly loaded to be handed off to a neighboring cell in the cluster;

(c) after all the UEs have been handed off from the identified RN, rebooting the identified RN so that it is being controlled and coordinated by the new access controller; and (d) repeating steps (b) and (c) for a second one of the plurality of RNs.

2. The method of claim 1, wherein causing the UEs to be handed off includes instructing each of the UEs to report a different RN, other than the identified RN, whose signal strength at the UE is stronger than that received from other RNs and further comprising instructing the UEs to attach to the different RN.

3. The method of claim 1, wherein causing the UEs to be handed off includes causing a transmit power of the identified RN to be reduced so that the UEs are handed off to another RN.

4. The method of claim 1, wherein rebooting the identified RN includes causing software used by the new access controller to control and coordinate the identified RN to be downloaded to the identified RN.

5. The method of claim 1, further comprising causing an increase in transmit power of one or more RNs neighboring the identified RN to provide service to UEs in a region no longer being serviced by the identified RN.

6. The method of claim 1, wherein the second one of the plurality of RNs is a most lightly loaded one of the plurality of RNs after the identified RN.

7. The method of claim 1, further comprising decommissioning the current access controller after all of the plurality of RNs have been rebooted so that they are being controlled and coordinated by the new access controller.

8. The method of claim 1, wherein the current access controller remains in a communication path between the UEs and a core network for those UEs that have been handed off from the identified RN and have not terminated and subsequently reinitiated their network connections.

9. A system for upgrading an access controller that controls and coordinates a plurality of radio nodes (RNs) each associated with a cell in a cluster of cells, comprising:

a first access controller configured to control the plurality of RNs at a first time period; and a second access controller, wherein at least one of the first access controller and the second access controller is configured to:

identify a most lightly loaded one of the plurality of RNs;

cause all user equipments (UEs) currently attached to the identified RN to be handed off to a neighboring cell in the cluster; and after all the UEs have been handed off from the identified RN, reboot the identified RN so that it is being controlled and coordinated by the second access controller, wherein the first access controller is decommissioned after all of the plurality of RNs have been rebooted so that they are being controlled and coordinated by the second access controller.

10. The system of claim 9, wherein at least one of the first access controller and the second access controller is further configured to repeat the following steps for a second one of the plurality of RNs:
    cause all UEs currently attached to the identified RN to be handed off to a neighboring cell in the cluster of cells; and
    after all the UEs have been handed off from the identified RN, reboot the identified RN so that it is being controlled and coordinated by the second access controller.

11. The system of claim 9, wherein at least one of the first access controller and the second access controller is further configured to cause software used by the second access controller to control and coordinate the identified RN to be downloaded to the identified RN.

12. A system for upgrading an access controller that controls and coordinates a plurality of radio nodes (RNs) each associated with a cell in a cluster of cells, comprising:
    a first access controller configured to control the plurality of RNs at a first time period; and
    a second access controller configured to control the plurality of RNs at a second time period,
    wherein at least one of the first access controller and the second access controller is configured to:
        identify a most lightly loaded one of the plurality of RNs;
        cause all user equipments (UEs) currently attached to the identified RN to be handed off to a neighboring cell in the cluster;
        after all the UEs have been handed off from the identified RN, reboot the identified RN; and
        cause software used by the second access controller to control and coordinate the identified RN to be downloaded to the identified RN.

13. The system of claim 12, wherein at least one of the first access controller and the second access controller is further configured to repeat the following steps for a second one of the plurality of RNs:
    cause all UEs currently attached to the identified RN to be handed off to a neighboring cell in the cluster of cells; and
    after all the UEs have been handed off from the identified RN, reboot the identified RN so that it is being controlled and coordinated by the second access controller.

14. The system of claim 12, wherein the first access controller is decommissioned after all of the plurality of RNs have been rebooted so that the RNs are being controlled and coordinated by the second access controller.

15. A system for upgrading an access controller that controls and coordinates a plurality of radio nodes (RNs) each associated with a cell in a cluster of cells, comprising:
    a first access controller configured to control the plurality of RNs at a first time period; and
    a second access controller configured to control the plurality of RNs at a second time period,
    wherein at least one of the first access controller and the second access controller is configured to:
        cause all user equipments (UEs) currently attached to an identified most lightly loaded RN of the plurality of RNs to be handed off to a neighboring cell in the cluster; and
        after all the UEs have been handed off from the identified RN, reboot the identified RN so that it is being controlled by the second access controller.

16. The system of claim 15, wherein at least one of the first access controller and the second access controller is further configured to repeat the following steps for a second one of the plurality of RNs:
    cause all UEs currently attached to the identified RN to be handed off to a neighboring cell in the cluster of cells; and
    after all the UEs have been handed off from the identified RN, reboot the identified RN so that it is being controlled and coordinated by the second access controller.

17. The system of claim 15, wherein at least one of the first access controller and the second access controller is further configured to cause software used by the second access controller to control and coordinate the identified RN to be downloaded to the identified RN.

18. The system of claim 15, wherein the first access controller is decommissioned after all of the plurality of RNs have been rebooted so that they are being controlled and coordinated by the second access controller.

* * * * *